(12) United States Patent
Nania (10) Patent No.: US 10,787,067 B2
(45) Date of Patent: Sep. 29, 2020

(54) DUAL FABRIC SOFT-TOP ROOF AND METHOD OF USING THE SAME

(71) Applicant: Ford Global Technologies, LLC, Dearborn, MI (US)

(72) Inventor: Adrian Nania, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 77 days.

(21) Appl. No.: 15/843,335

(22) Filed: Dec. 15, 2017

(65) Prior Publication Data
US 2019/0184800 A1    Jun. 20, 2019

(51) Int. Cl.
*B60J 7/08*       (2006.01)
*E04H 15/06*    (2006.01)

(52) U.S. Cl.
CPC .............. *B60J 7/085* (2013.01); *E04H 15/06* (2013.01)

(58) Field of Classification Search
CPC . B60J 7/0012; B60J 7/067; B60J 7/068; B60J 7/085; B60J 7/1295
USPC .......................................... 296/218, 219, 98
See application file for complete search history.

(56) References Cited

U.S. PATENT DOCUMENTS

| 1,999,171 | A | * | 4/1935 | Bryant ...................... B60J 11/02 150/166 |
| 5,018,783 | A |   | 5/1991 | Chamings et al. |
| 5,567,002 | A |   | 10/1996 | Tair |
| 5,711,568 | A |   | 1/1998 | Diem et al. |
| 5,803,529 | A |   | 9/1998 | Perry-Bores et al. |
| 6,012,759 | A | * | 1/2000 | Adamek ................... B60J 11/02 296/136.03 |
| 6,295,713 | B1 | * | 10/2001 | Hilliard ................... B60J 7/1226 29/446 |
| 6,782,904 | B2 | * | 8/2004 | Tien ......................... B60J 11/00 135/88.01 |
| 7,137,661 | B2 | * | 11/2006 | Neuer ....................... B60J 11/02 296/136.01 |
| 7,900,991 | B2 |   | 3/2011 | Fallis, III et al. |
| 8,662,563 | B1 | * | 3/2014 | Hardenbrook ........... E04H 15/08 135/88.07 |
| 8,727,414 | B2 | * | 5/2014 | Staib ....................... B60R 5/047 296/24.43 |
| 2001/0054833 | A1 | * | 12/2001 | Wingen ................. B60J 7/0015 296/214 |
| 2002/0145310 | A1 | * | 10/2002 | Schatzler ............... B60J 7/0015 296/214 |
| 2002/0167202 | A1 | * | 11/2002 | Pfalzgraf ............... B60J 7/0015 296/214 |
| 2015/0028630 | A1 | * | 1/2015 | Grimm ................... B60J 7/0015 296/213 |
| 2017/0197497 | A1 | * | 7/2017 | Stickles ................. B60J 7/1291 |
| 2019/0054806 | A1 | * | 2/2019 | Getzschman ............ B60J 7/067 |

FOREIGN PATENT DOCUMENTS

| CN | 103085706 A | 5/2013 |
| EP | 08033901 A1 | 3/1997 |

* cited by examiner

*Primary Examiner* — Jason S Morrow
(74) *Attorney, Agent, or Firm* — David Copiellie; Carlson, Gaskey & Olds, P.C.

(57) ABSTRACT

An exemplary motor vehicle includes, among other things, a roof including a first fabric and a second fabric. The first fabric and the second fabric are selectively deployed to cover at least a portion of a passenger cabin of the motor vehicle. Further, the first fabric is configured to filter a different level of light than the second fabric.

17 Claims, 8 Drawing Sheets

DUAL FABRIC SOFT-TOP ROOF AND METHOD OF USING THE SAME

TECHNICAL FIELD

This disclosure relates to a dual fabric soft-top roof for a motor vehicle and a method of using the same.

BACKGROUND

Some motor vehicles, such as sport utility vehicles (SUVs), are known to include soft-top roofs, wherein the roof of the vehicle includes a fabric covering at least a portion of the passenger cabin. Typically, the fabric is made of canvas or leather, and is configured to protect the occupants of the passenger cabin from exposure to the elements, namely rain and sun.

SUMMARY

A motor vehicle according to an exemplary aspect of the present disclosure includes, among other things, a roof including a first fabric and a second fabric. The first fabric and the second fabric are selectively deployed to cover at least a portion of a passenger cabin of the motor vehicle. Further, the first fabric is configured to filter a different level of light than the second fabric.

In a further non-limiting embodiment of the foregoing motor vehicle, the first fabric is a solid fabric, and the second fabric is a mesh fabric.

In a further non-limiting embodiment of any of the foregoing motor vehicles, the first fabric and the second fabric are selectively deployed independent of one another.

In a further non-limiting embodiment of any of the foregoing motor vehicles, an end of the first fabric is attached to a first pin and an end of the second fabric is attached to a second pin.

In a further non-limiting embodiment of any of the foregoing motor vehicles, the first and second pins are provided in a common housing.

In a further non-limiting embodiment of any of the foregoing motor vehicles, the common housing is selectively removable from the motor vehicle.

In a further non-limiting embodiment of any of the foregoing motor vehicles, the first and second pins are rotationally biased to urge the first fabric and the second fabric to a retracted position.

In a further non-limiting embodiment of any of the foregoing motor vehicles, the first and second pins are rotationally biased by first and second springs, respectively.

In a further non-limiting embodiment of any of the foregoing motor vehicles, the vehicle includes a first roof structure extending along a first side of the motor vehicle and a second roof structure extending along a second side of the motor vehicle opposite the first side. Further, when deployed, the first and second fabrics are configured to filter light that would otherwise have entered the passenger cabin between the first and second roof structures.

In a further non-limiting embodiment of any of the foregoing motor vehicles, the motor vehicle includes a first flap attached to the first roof structure and a second flap attached to the second roof structure, the first and second flaps selectively attachable to the first fabric.

In a further non-limiting embodiment of any of the foregoing motor vehicles, the first and second fabrics are configured to be deployed by pulling on respective free ends thereof, and the free ends of the first and second fabrics are selectively attachable to the first and second roof structures to hold the first and second fabrics in place above the passenger cabin.

In a further non-limiting embodiment of any of the foregoing motor vehicles, the motor vehicle includes a plurality of cross-bars spanning between the first and second roof structures.

In a further non-limiting embodiment of any of the foregoing motor vehicles, the free ends of the first and second fabrics are selectively attachable at points adjacent the cross-bars and at points spaced-apart from the cross-bars.

In a further non-limiting embodiment of any of the foregoing motor vehicles, the first and second fabrics include first and second pull bars, respectively, adjacent the free ends.

In a further non-limiting embodiment of any of the foregoing motor vehicles, the first and second pull bars are configured for attachment to the first and second roof structures, and, when attached, the first and second pull bars are configured to bow to resist sagging of the first and second fabrics.

In a further non-limiting embodiment of any of the foregoing motor vehicles, one of the first and second fabrics is configured to deploy in a direction opposite the passenger cabin to provide a shelter area adjacent the motor vehicle.

A method according to an exemplary aspect of the present disclosure includes, among other things, deploying at least one of a first fabric and a second fabric to cover at least a portion of a passenger cabin of a motor vehicle. The first fabric is configured to filter a different level of light than the second fabric.

In a further non-limiting embodiment of any of the foregoing motor vehicles, the first fabric is a solid material and the second fabric is a mesh material.

In a further non-limiting embodiment of any of the foregoing motor vehicles, the method includes biasing the first and second fabrics toward a retracted position by respective first and second springs. Further, the deploying step includes pulling at least one of the first and second fabrics to overcome the biasing force of at least one of the first and second springs.

In a further non-limiting embodiment of any of the foregoing motor vehicles, the method includes attaching the first fabric at a first point along a roof, and attaching the second fabric at a second point along the roof, the second point spaced-apart from the first point.

BRIEF DESCRIPTION OF THE DRAWINGS

FIG. 6 illustrates the roof of the motor vehicle from a top-perspective view. In FIG. 6, the second fabric is fully deployed.

FIG. 7 illustrates the roof of the motor vehicle from a top-perspective view. In FIG. 7, the first fabric is fully deployed.

FIG. 8 illustrates the roof of the motor vehicle from a top-perspective view. In FIG. 8, the second fabric is fully deployed and the first fabric is partially deployed over a cargo area of the vehicle.

FIG. 9 illustrates the roof of the motor vehicle from a top-perspective view. In FIG. 9, the second fabric is fully deployed and the first fabric is partially deployed over a cargo area and a rear seat of the vehicle.

FIG. 10 illustrates the roof of the motor vehicle from a top-perspective view. In FIG. 10, the first and second fabrics are partially deployed.

FIG. 11 illustrates the roof of the motor vehicle from a side-perspective view. In FIG. 11, bows are attached to the roof.

DETAILED DESCRIPTION

This disclosure relates to a dual fabric soft-top roof for a motor vehicle and a method of using the same. In one aspect of this disclosure, a motor vehicle has a roof including a first fabric and a second fabric. The first fabric and the second fabric are selectively deployed to cover at least a portion of a passenger cabin of the motor vehicle. Further, the first fabric filters a different level of light than the second fabric. Thus, the soft-top roof of this disclosure provides increased functionality by allowing a user to select a fabric arrangement that achieves a desired level of light filtering. Additionally, the first and second fabrics are relatively quickly deployed and are self-stored, among other benefits.

Figure 1:
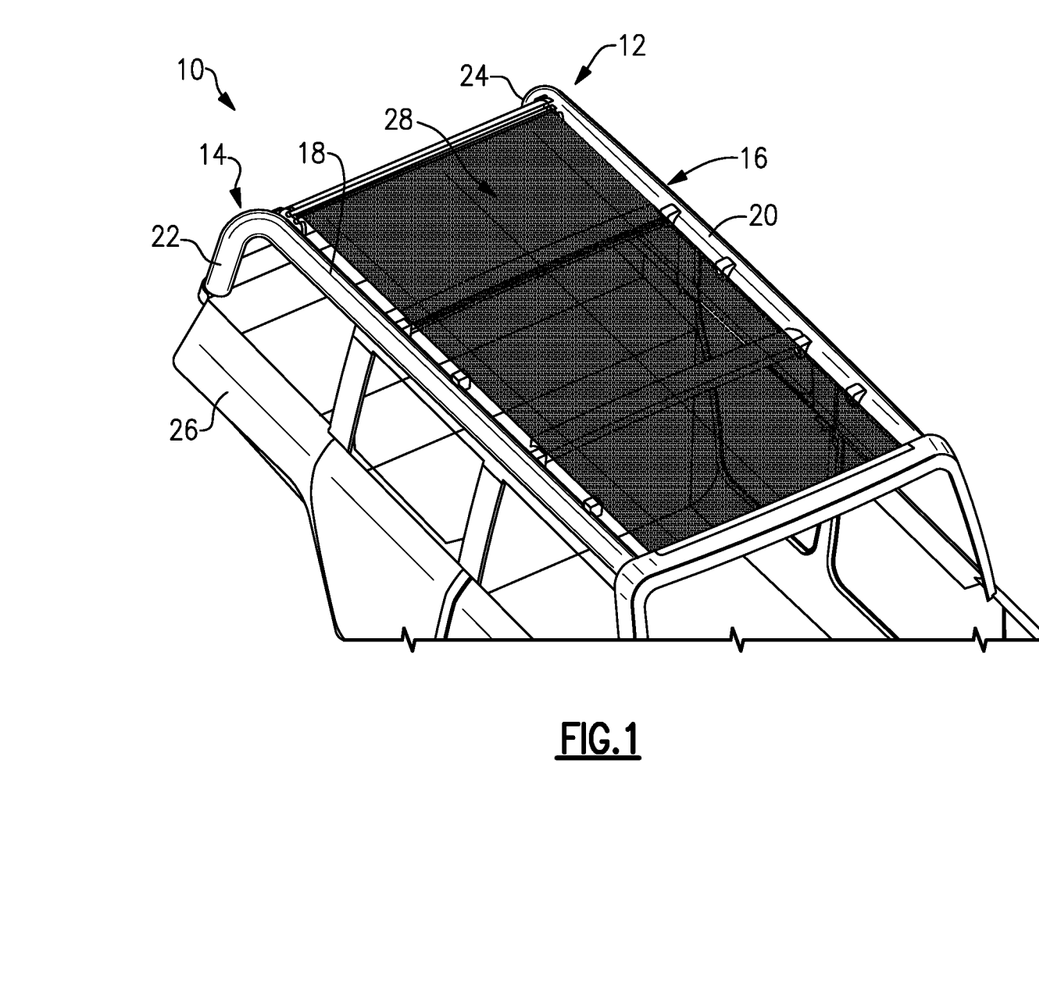
FIG. 1 is a top-perspective view of a roof of a motor vehicle.

Referring to the drawings, FIG. 1 is a top-perspective view of a portion of an example motor vehicle 10, and in particular shows the roof 12 of the motor vehicle. In FIG. 1, the motor vehicle 10 is a sport utility vehicle (SUV), but it should be understood that this disclosure extends to other types of vehicles.

In the illustrated example, the roof 12 includes a first roof structure 14 and a second roof structure 16. The first and second roof structures 14, 16, in this example, are roll bars. Each of the first and second roof structures 14, 16 includes a horizontal portion 18, 20 extending along opposite sides of the vehicle 10, and vertical portions 22, 24 extending between the horizontal portions 18, 20 and a vehicle body 26. While a particular roof structure is shown in the figures, this disclosure extends to other roof arrangements, including roofs that are not provided by roll bars.

The roof 12 includes a soft-top roof. In particular, the roof 12 includes a fabric arrangement 28 having two fabrics, in this example. In this way, the roof 12 includes a dual-fabric soft-top roof. The fabric arrangement 28 is selectively retracted and deployed above a passenger cabin of the vehicle 10. When the fabric arrangement 28 is deployed, fabric is configured to protect the occupants of the passenger cabin from exposure to sun or rain. The details of the fabric arrangement 28 will be discussed in greater detail below.

Figure 2:
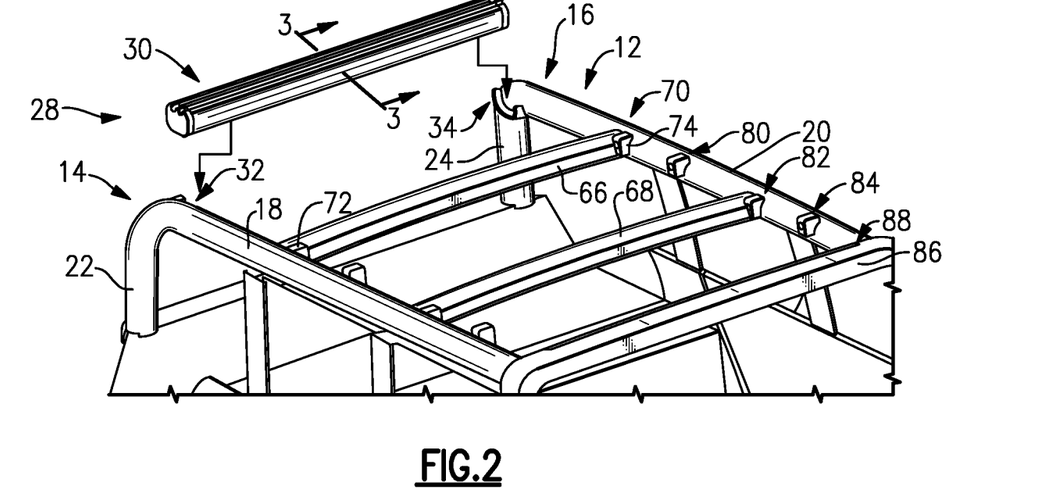
FIG. 2 is a top-perspective view of the roof of the motor vehicle with a roll cartridge removed from the roof.

FIG. 2 illustrates a housing, or roll cartridge 30, which is configured to store the fabrics of the fabric arrangement 28. In FIG. 2, the fabrics of the fabric arrangement 28 are fully retracted into the roll cartridge 30. The roll cartridge 30 is selectively attachable to the roof 12 by way of first and second receivers 32, 34 formed in respective first and second roof structures 14, 16. The first and second receivers 32, 34 are located adjacent a junction of the horizontal portions 18, 20 and vertical portions 22, 24 of the first and second roof structures 14, 16. The first and second receivers 32, 34 are configured to couple to ends of the roll cartridge 30 to affix the roll cartridge 30 to the roof 12. The attachment between the roll cartridge 30 and the first and second receivers 32, 34 may include fasteners or a snap-fit connection, as examples. A user may attach the roll cartridge 30 to the roof 12 when use of the fabric arrangement 28 is desired, and may remove the roll cartridge 30 when it is not.

Figure 3:
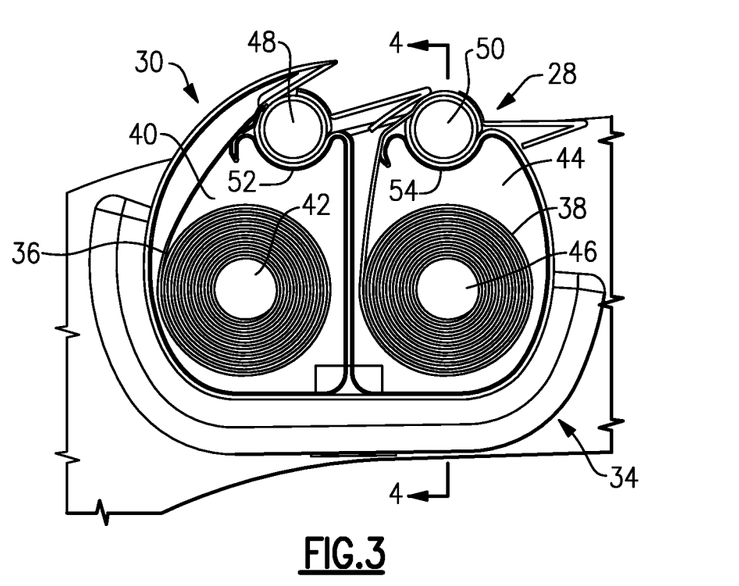
FIG. 3 is a cross-sectional view of the roll cartridge taken along line 3-3 from FIG. 2.

FIG. 3 is a cross-section of the roll cartridge 30 taken along line 3-3 and illustrates the detail of the fabric arrangement 28 when both fabrics are fully retracted into the roll cartridge 30. The fabric arrangement 28, in this example, includes a first fabric 36 and a second fabric 38. The first and second fabrics 36, 38 are conveniently stored within a common housing, which in this example is the roll cartridge 30. The roll cartridge 30, thus, provides a self-contained unit that is selectively attachable to the roof 12 with relative ease.

The first and second fabrics 36, 38 are different types of fabric, and provide a different level of light filtering. In this example, the first fabric 36 is a solid fabric, such as leather or canvas. In this example, the first fabric 36 is configured to completely block light. In this sense, the term "filtering" is used to be inclusive of "blocking." The first fabric 36 need not completely block light, however, and could be provided by a material that allows some light to pass through. The second fabric 38 is a mesh fabric, in this example, having a plurality of small holes. Alternatively, the second fabric 38 could be provided by other materials, such as cellular fabrics. The first fabric 36 may also be waterproof, and thus may provide additional protection from the elements. As will be discussed below, the first and second fabrics 36, 38 can be selectively deployed over at least a portion of the passenger cabin to provide a desired level of light filtering.

The roll cartridge 30 includes a first housing section 40 containing a first pin 42, about which the first fabric 36 is arranged. The first housing section 40, in this example, is rearward of a second housing section 44, which contains a second pin 46, about which the second fabric 38 is arranged. One end of the first fabric 36 is attached to the first pin 42, while an opposite, free end of the first fabric 36 is attached to a first pull bar 48. Likewise, the second fabric 38 is attached to the second pin 46 at one end, and an opposite, free end of the second fabric 38 is attached to a second pull bar 50. When the first and second fabrics 36, 38 are retracted, the first and second pull bars 48, 50 rest within respective arcuate recesses 52, 54 formed in an upper surface of the roll cartridge 30.

The first and second pull bars 48, 50 span along the width of the first and second fabrics 36, 38, and are configured to be pulled by a user to deploy the first and second fabrics. Ends of the first and second pull bars 48, 50 are configured to engage with attachment points formed in the roof 12 to attach the first and second fabrics 36, 38 at desired locations along the length of the roof 12. As such, a user can provide a desired level of light filtering along various sections of the roof 12. Example configurations will be discussed below.

Figure 4:
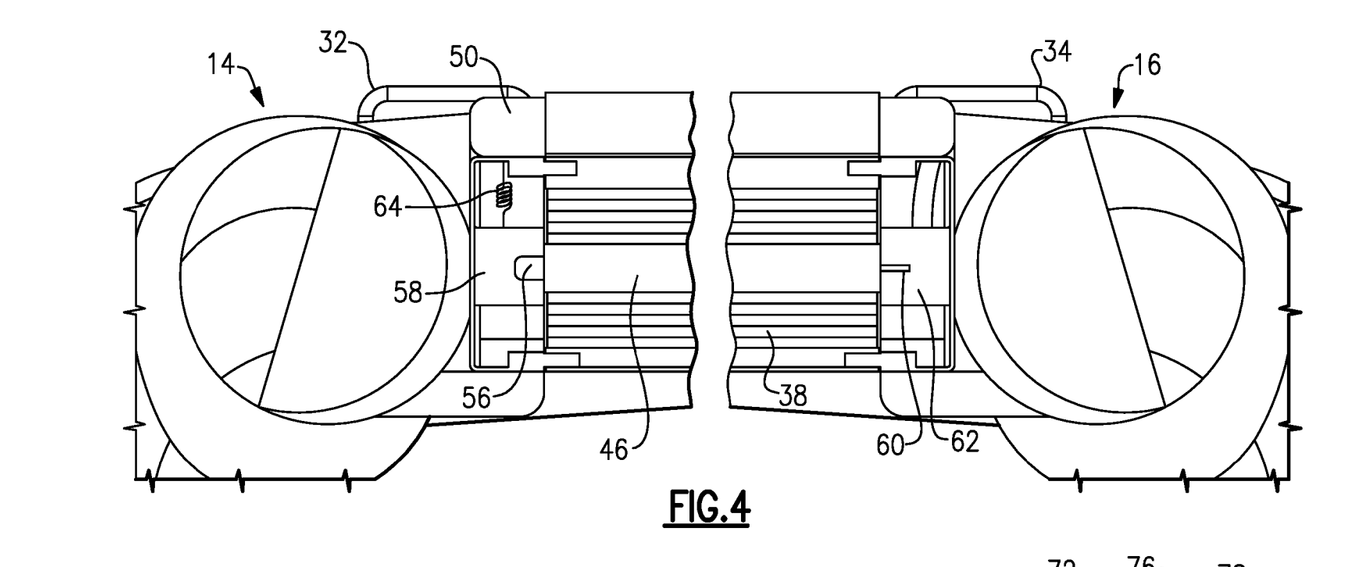
FIG. 4 is a cross-sectional view of the roll cartridge and adjacent roof structure, taken along line 4-4 from FIG. 3.

In this example, both the first and second fabrics 36, 38 are biased toward the retracted position of FIG. 3. This arrangement makes it relatively easy to store the fabrics, and also keeps tension on the fabrics 36, 38 when deployed, which reduces sagging. FIG. 4 is a cross-sectional view taken along line 4-4 in FIG. 3, and illustrates the detail of the arrangement of the second fabric 38 relative to the second pin 46. While the second fabric 38 and second pin 46 are shown, it should be understood that the first fabric 36 and first pin 42 are arranged similarly.

In this example, the second pin 46 has a first end 56 configured to engage a first cap 58 of the roll cartridge 30. The first end 56 is substantially cylindrically-shaped. The second pin 46 has a second end 60 opposite the first end 56. The second end 60 is configured to engage a second cap 62 of the roll cartridge 30. The second end 62 is substantially flat (i.e., substantially rectangular in cross-section).

The second pin 46 may be made of multiple structures, including two housings and a spring, much the same way as a roller blind. A spring 64 is shown schematically in FIG. 4. It should be understood that the spring 64 could be located interiorly of the second pin 46 or integrated into the second pin 46. The spring 64 may be a clock spring in some examples. This disclosure is not limited to any particular spring type, however.

When a user pulls the second pull bar 50, the first end 56 of the second pin 46 rotates relative to the first cap 58, and the second end 60 does not rotate relative to the second cap 62. Further, as the second bar 50 is pulled away from the retracted position, tension on the spring 64 increases, which biases the second fabric 38 to the retracted position. Again, while not shown, the first fabric 36 and first pin 42 are arranged similarly, including a dedicated spring that behaves the same way as the spring 64.

Turning back to FIG. 2, the roof 12 includes a plurality of attachment points for receiving the first and second pull bars 48, 50, thereby holding the first and second fabrics 36, 38 in place above the passenger compartment. The roof 12, in this example, includes first and second cross-bars 66, 68 spanning between the horizontal portions 18, 20 of the roof structures 14, 16. The roof 12 includes five sets of attachment points in this example. A first set of attachment points 70 is disposed adjacent the first cross-bar 66. The first set of attachment points 70 includes a first attachment point 72 formed in the horizontal portion 18 and a second attachment point 74 formed in the horizontal portion 20.

Figure 5A:
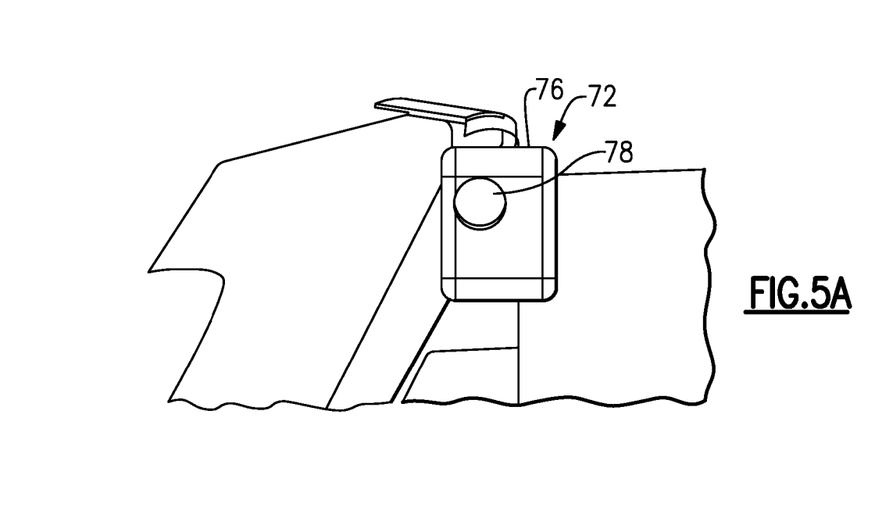
FIG. 5A illustrates an attachment point.

The detail of one of the attachment points is illustrated in FIG. 5A. Specifically, FIG. 5A illustrates the first attachment point 72. In general, the first attachment point 72 is provided by a body 76 having a recess 78 formed therein. The recess 78 is sized and shaped to receive an end of the first and second pull bars 48, 50. While only the first attachment point 72 is shown in FIG. 5A, it should be understood that the second attachment point 74 is arranged similarly.

Figure 5B:
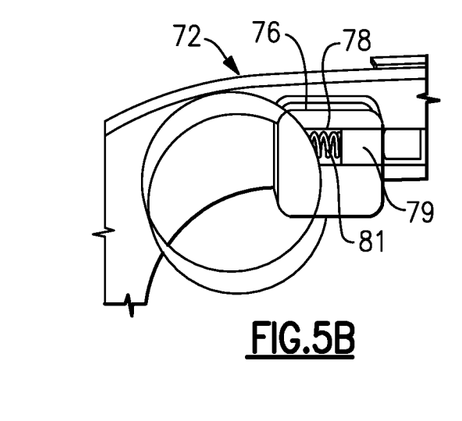
FIG. 5B illustrates an optional aspect of an attachment point.

Generally, the first and second pull bars 48, 50 are sized and configured such that, when received in the recesses of the attachment points, the first and second pull bars 48, 50 bow slightly upward to resist sagging of the first and second fabrics 36, 38. In one example, which is shown in FIG. 5B, the recess 78 could include a plug 79 biased toward a centerline of the vehicle 10 by a spring 81. When the first and second pull bars 48, 50 are received in the recesses 78, the spring 81 applies a compressive force on the pull bar via the plug 79, which causes the first and second pull bars 48, 50 to bow upward. Alternatively, ends of the pull bars 48, 50 could include a spring mechanism configured to work substantially the same way.

With reference back to FIG. 2, in addition to the first set of attachment points 70, the roof 12 includes a second set of attachment points 80 between the first and second cross-bars 66, 68, a third set of attachment points 82 adjacent the second cross-bar 68, a fourth set of attachment points 84 between the second cross-bar 68 and a front body structure 86, which supports the windshield of the vehicle 10, and a fifth set of attachment points 88 integrated into the front body structure 86. Alternatively, the fifth set of attachment points 88 could be replaced by an arcuate slot or recess sized and shaped to hold the first and second bars 48, 50. Each of the sets of attachment points may include attachment points arranged as shown in FIGS. 5A-5B.

Figure 6:
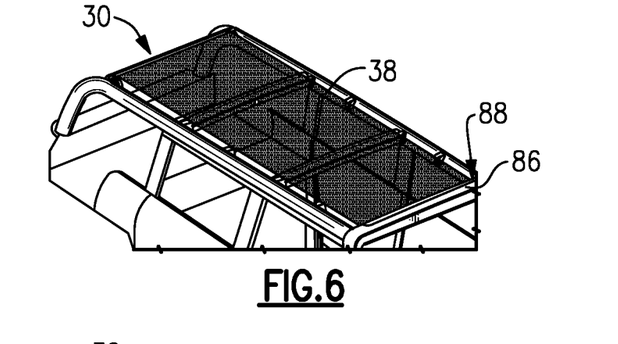

The attachment points allow a user to customize a level of light filtering by attaching the first and second fabrics 36, 38 at various points along the length of the roof 12. FIG. 6, for example, illustrates an example in which a the second fabric 38 is fully deployed. In particular, in FIG. 6, the second fabric 38 has been pulled relative to the retracted position of FIG. 2, and the second pull bar 50 has been attached to the fifth set of attachment points 88 adjacent the front body structure 86. In the arrangement of FIG. 6, the first fabric 36 is fully retracted, as shown in FIGS. 2 and 3. In this way, the second fabric 38, which is a mesh fabric in this example, provides a moderate level of light filtering over the entire passenger cabin. While some light filtering, the mesh fabric still provides the occupants of the passenger cabin with some exposure the outside environment, which is enjoyable for some users, especially in good weather conditions.

Figure 7:
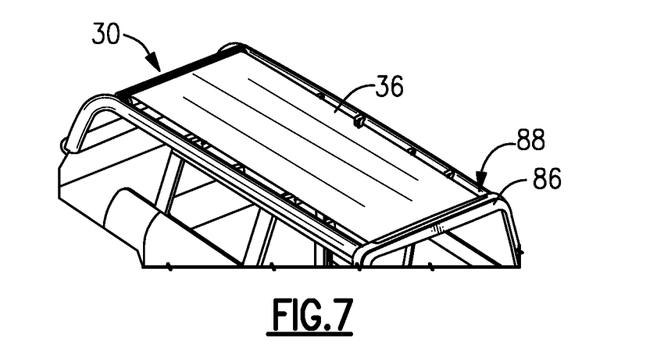

FIG. 7 illustrates an example in which the first fabric 36 is fully deployed and the second fabric 38 is fully retracted. In particular, the first fabric 36 has been pulled relative to the retracted position of FIG. 2, and the first pull bar 50 has been attached to the fifth set of attachment points 88. In this way, the first fabric 36, which is a solid material such as leather or canvas, provides a relatively high level of light filtering, and in some examples completely blocks light. The first fabric 36 may also be waterproof, providing protection from rain. The arrangement of FIG. 7 may be particularly useful when the occupants of the vehicle desire added sun protection or during rainy conditions.

Figures 8, 10:
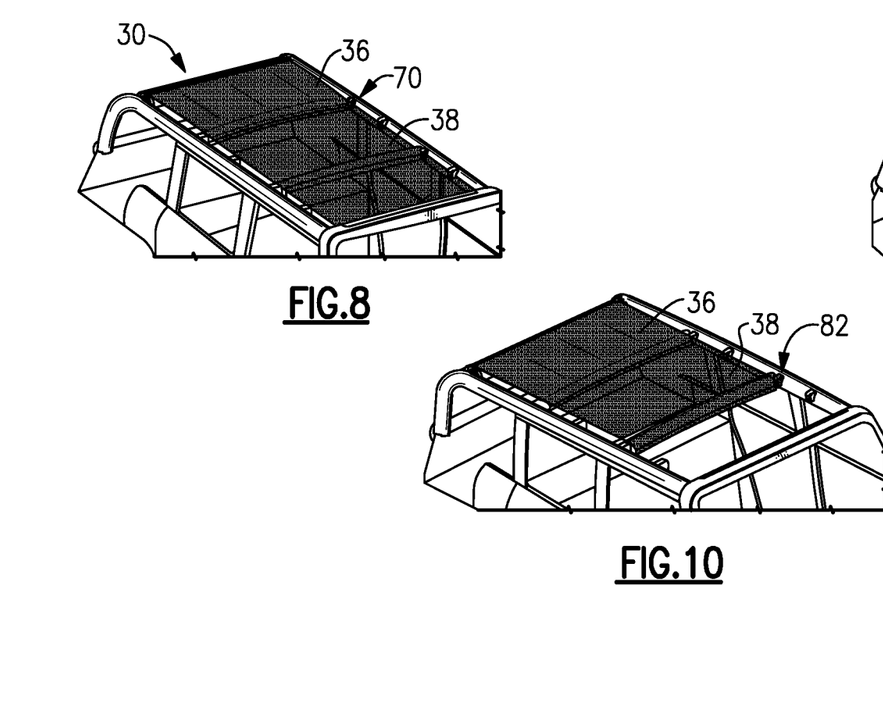

Various other arrangements are possible. In FIG. 8, for example, the second fabric 38 is fully deployed, while the first fabric 36 is partially deployed and attached to the first set of attachment points 70. In this way, the portion of the cabin between the roll cartridge 30 and the first set of attachment points 70 is provided with additional light filtering, while the remainder of the passenger compartment is provided with less light filtering. This arrangement may be desirable when the cargo stored in the rear of the vehicle 10 requires a higher level of the light filtering than the occupants of the vehicle prefer.

Figure 9:
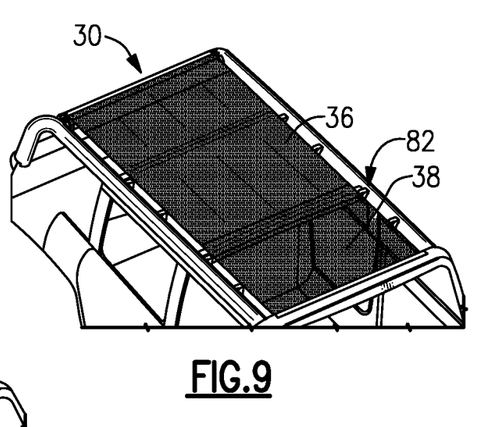

FIG. 9 is similar to FIG. 8, except the first fabric 36 is partially deployed and attached to the third set of attachment points 82. In this way, the occupants of the rear seat of the vehicle 10 are provided with additional light filtering, while the driver and front-passenger of the vehicle 10 are provided with less light filtering. This arrangement may be beneficial when children, or those more sensitive to exposure to light, are seated in the rear seat of the vehicle 10.

FIG. 10 is yet another example. FIG. 10 is similar to the arrangement of FIG. 8, but the second fabric 38 is partially deployed and attached to the third set of attachment points 82 as opposed to the fifth set of attachment points 88. In FIG. 10, the cargo area of the vehicle is provided with the highest level of light filtering, the rear seat is provided with a lower level of light filtering, the driver and front-passenger are exposed to the environment.

While various arrangements have been shown and described relative to FIGS. 6-10, other arrangements come within the scope of this disclosure. Indeed, the adaptability of the fabric arrangement 28, including the ability to selectively deploy the first and second fabrics independent of one another, provides the user with the ability to customize a level of protection from the environment. The user can use the fabric arrangement to enjoy the outside environment, while still offering protection from exposure to light and rain, as desired.

Figure 11:
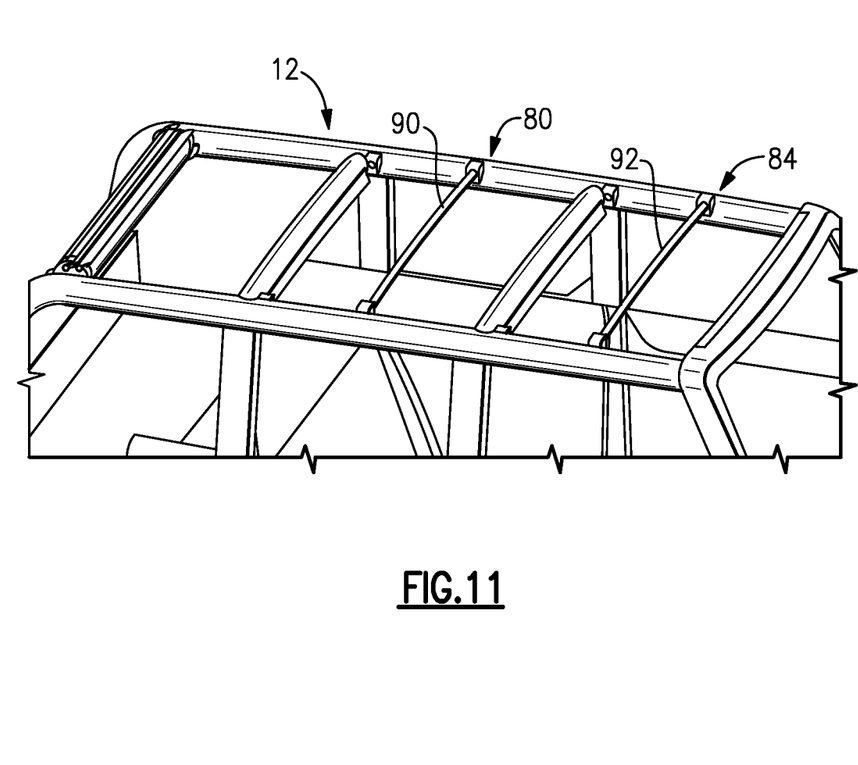

When the fabrics 36, 38 are fully deployed, the cross-bars 66, 68 prevent the first and second fabrics 36, 38 from sagging along the length of the roof 12. In order to provide additional sag prevention, or to provide sag prevention in vehicles 10 without cross-bars, a plurality of bows can be positioned between various one of the sets of attachment points 70, 80, 82, 84, 88, as shown in FIG. 11. In FIG. 11, first and second bows 90, 92 span between the second and fourth sets of attachment points 80, 84. The first and second bows 90, 92 are similar to the pull bars 48, 50. In fact, in one example, the first and second bows 90, 92 are provided by the pull bars 48, 50. In that example, the pull bars 48, 50 would be detached from the free ends of the fabrics 36, 38, and placed as shown in FIG. 11. Alternatively, the first and second bows 90, 92 are separate structures. In either example, the first and second bows 90, 92 may be particularly beneficial when the first fabric 36, which is relatively heavier than the second fabric 38, is fully deployed. The first and second bows 90, 92 reduce sagging of fabric, which prevents water from pooling above the fabric during rainy conditions.

Figures 12, 13:
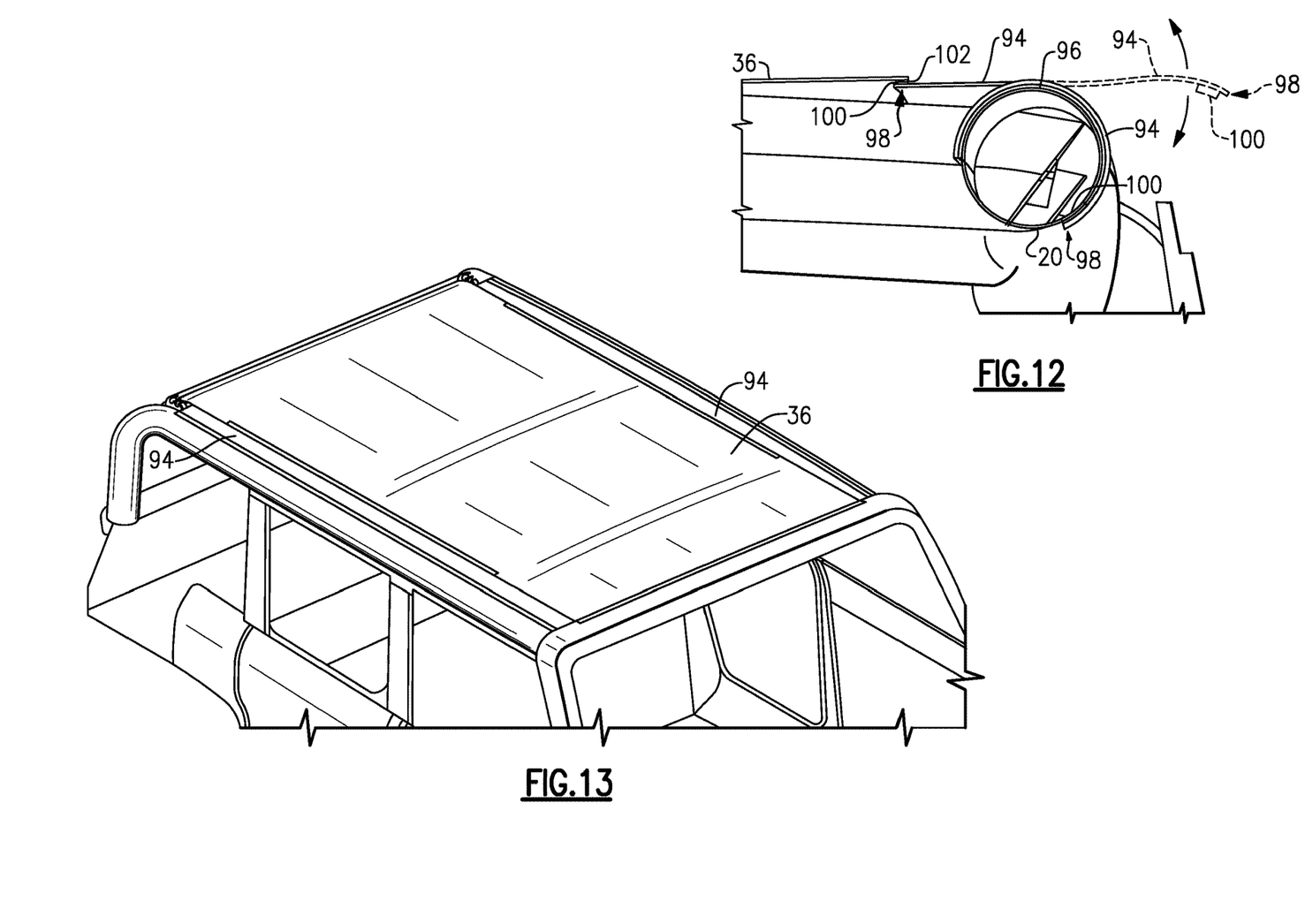
FIG. 12 is a cross-sectional view of a portion of the roof of the motor vehicle, and illustrates a flap.
FIG. 13 illustrates the roof of the motor vehicle from a top-perspective view, and in particular illustrates flaps attached to sides of the first fabric.

Further, the first and second fabrics 36, 38 may be attachable to side flaps. In one example, the side flaps serve to prevent rain from entering the passenger cabin between sides of the first fabric 36 and the horizontal portions 18, 20 of the roof 12. In FIG. 12, a flap 94 is shown. At one end 96 of the flap 94, the flap 94 is pivotably attached to the roof 12. Here, the end 96 is attached to a top of the horizontal portion 20 of the roof 12. A free end 98 of the flap 94 includes a first hook-and-loop fastener (such as a Velcro® fastener) 100 configured for attachment to an underside of the horizontal portion 20 and to a side of the first fabric 36, which may include a corresponding hook-and-loop fastener 102.

FIG. 13 shows flaps 94 attached to both sides of the first fabric 36 when the first fabric 36 is fully deployed. As shown, the flaps 94 extend along substantially the entire length of the horizontal portions 18, 20 of the first and second roof structures 14, 16. The flaps 94 are particularly useful when added rain protection is desired. Further, when not in use, the flaps 94 are conveniently stored by attachment to an underside of the horizontal portions 18, 20.

Figure 14:
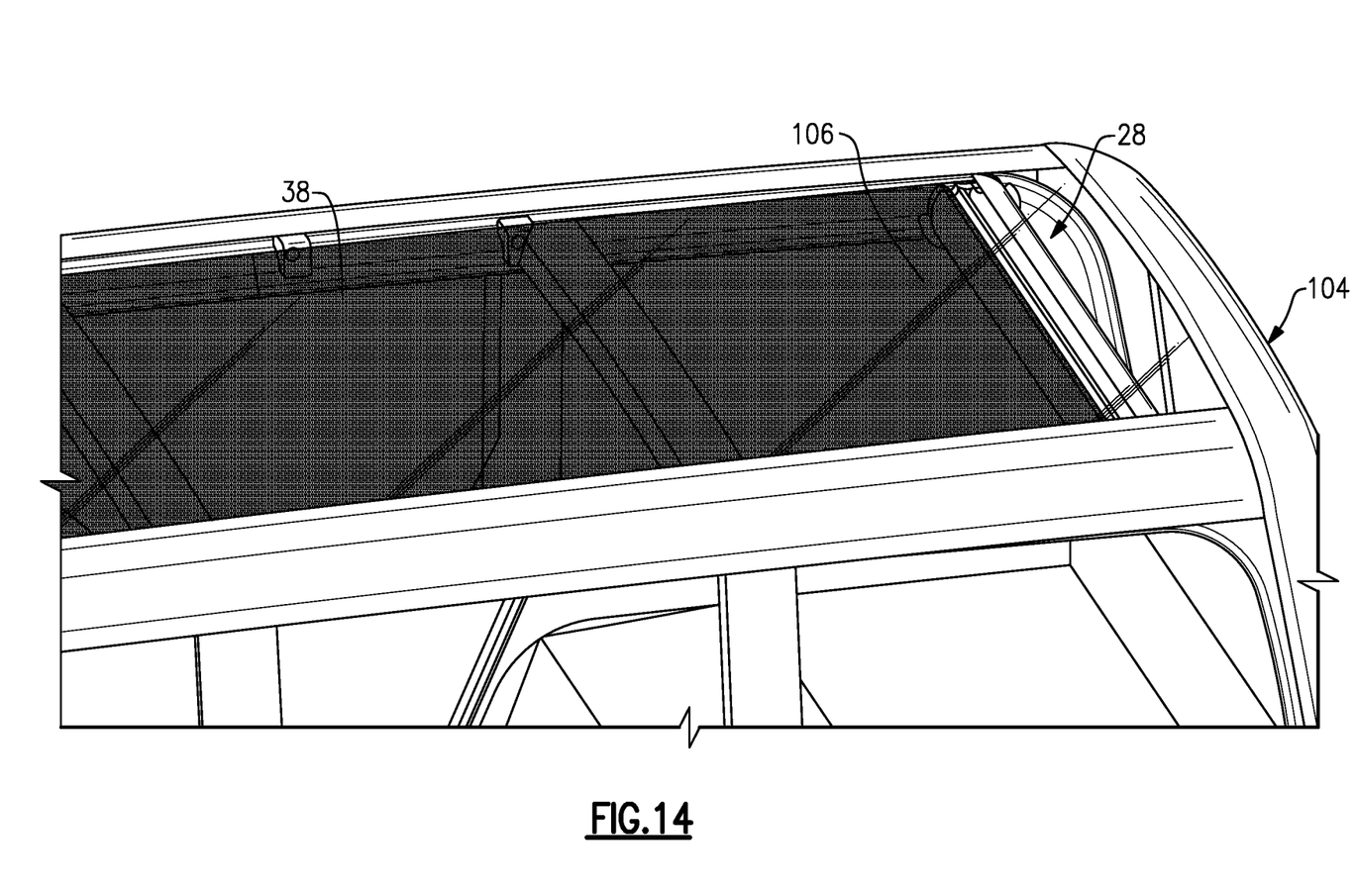
FIG. 14 illustrates the fabric arrangement used with a hard-top roof.

While the fabric arrangement 28 generally provides a soft-top roof, the fabric arrangement 28 is also useful with hard-top roofs. In FIG. 14, a hard-top roof 104 having one or more transparent panels 106 is positioned over top of the fabric arrangement 28. The second fabric 38 can be deployed to provide light filtering beneath the hard-top roof 104.

Figure 15:
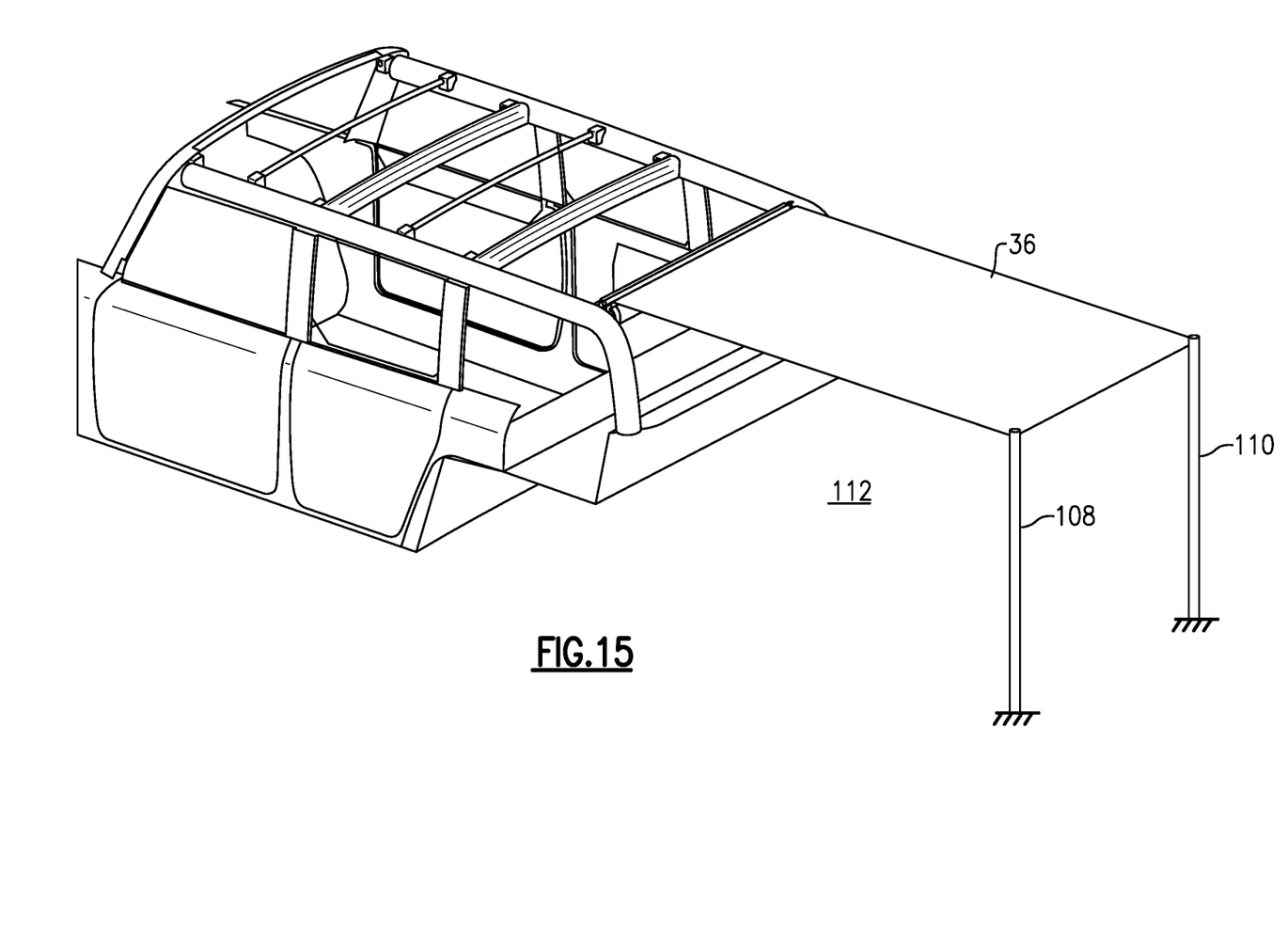
FIG. 15 illustrates the fabric arrangement used to provide a shelter area.

The fabric arrangement 28 may be useful in other applications. In FIG. 15, for example, the first fabric 36 is deployed in a direction opposite the roof 12 and affixed to two poles 108, 110, which are positioned rearward of the vehicle. The poles 108, 110 support the first fabric 36 above the ground. While not shown, the poles 108, 110 could be staked into the ground for additional support. In this way, the first fabric 36 provides a shelter area 112 behind the vehicle 10, which may be useful in camping or tailgating applications.

It should be understood that terms such as "about," "substantially," and "generally" are not intended to be boundaryless terms, and should be interpreted consistent with the way one skilled in the art would interpret those terms. Further, directional terms such as "above," "below," "forward," "rearward," "inside," "outside," "vertical," "top," and "bottom" are used with reference to an normal operational attitude of a motor vehicle, and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a roof including a first fabric and a second fabric, the first fabric and the second fabric selectively deployed to cover at least a portion of a passenger cabin of the motor vehicle, the first fabric configured to filter a different level of light than the second fabric, wherein an end of the first fabric is attached to a first pin and an end of the second fabric is attached to a second pin, and wherein the first and second pins are provided in a common housing.

2. The motor vehicle as recited in claim 1, wherein the first fabric is a solid fabric, and the second fabric is a mesh fabric.

3. The motor vehicle as recited in claim 1, wherein the first fabric and the second fabric are selectively deployed independent of one another.

4. The motor vehicle as recited in claim 1, wherein the common housing is selectively removable from the motor vehicle.

5. The motor vehicle as recited in claim 1, wherein the first and second pins are rotationally biased to urge the first fabric and the second fabric to a retracted position.

6. The motor vehicle as recited in claim 5, wherein the first and second pins are rotationally biased by first and second springs, respectively.

7. A motor vehicle, comprising:
   a roof including a first fabric and a second fabric, the first fabric and the second fabric selectively deployed to cover at least a portion of a passenger cabin of the motor vehicle, the first fabric configured to filter a different level of light than the second fabric; and
   further comprising a first roof structure extending along a first side of the motor vehicle and a second roof structure extending along a second side of the motor vehicle opposite the first side, and wherein, when deployed, the first and second fabrics are configured to filter light that would otherwise have entered the passenger cabin between the first and second roof structures.

8. The motor vehicle as recited in claim 7, further comprising a first flap attached to the first roof structure and a second flap attached to the second roof structure, the first and second flaps selectively attachable to the first fabric.

9. The motor vehicle as recited in claim 7, wherein:

the first and second fabrics are configured to be deployed by pulling on respective free ends thereof, and the free ends of the first and second fabrics are selectively attachable to the first and second roof structures to hold the first and second fabrics in place above the passenger cabin.

10. The motor vehicle as recited in claim 9, further comprising a plurality of cross-bars spanning between the first and second roof structures.

11. The motor vehicle as recited in claim 10, wherein the free ends of the first and second fabrics are selectively attachable at points adjacent the cross-bars and at points spaced-apart from the cross-bars.

12. The motor vehicle as recited in claim 9, wherein the first and second fabrics include first and second pull bars, respectively, adjacent the free ends.

13. The motor vehicle as recited in claim 12, wherein the first and second pull bars are configured for attachment to the first and second roof structures, and, when attached, the first and second pull bars are configured to bow to resist sagging of the first and second fabrics.

14. A motor vehicle, comprising:
a roof including a first fabric and a second fabric, the first fabric and the second fabric selectively deployed to cover at least a portion of a passenger cabin of the motor vehicle, the first fabric configured to filter a different level of light than the second fabric, wherein one of the first and second fabrics is configured to deploy in a direction opposite the passenger cabin to provide a shelter area adjacent the motor vehicle.

15. A method, comprising:
deploying at least one of a first fabric and a second fabric and attaching the at least one of the first fabric and the second fabric at a point along a roof of a motor vehicle to cover at least a portion of a passenger cabin of the motor vehicle, the first fabric configured to filter a different level of light than the second fabric;

biasing the first and second fabrics toward a retracted position by respective first and second springs, and wherein the deploying step includes pulling at least one of the first and second fabrics to overcome the biasing force of at least one of the first and second springs.

16. The method as recited in claim 15, wherein the first fabric is a solid material and the second fabric is a mesh material.

17. The method as recited in claim 15, further comprising:
attaching the first fabric at a first point along a roof; and
attaching the second fabric at a second point along the roof, the second point spaced-apart from the first point.

* * * * *